Figure 1:
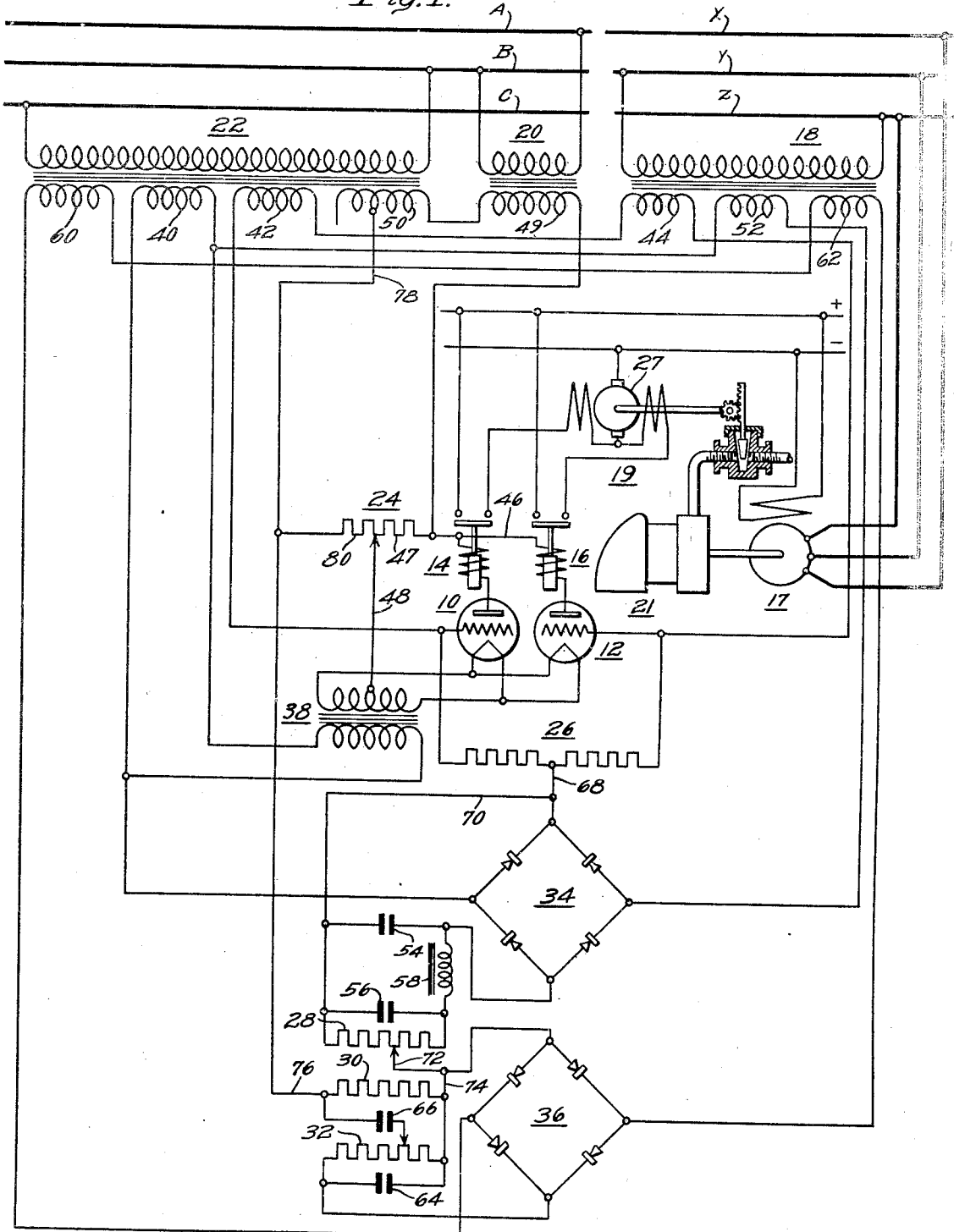

March 4, 1941.  F. H. GULLIKSEN  2,233,604

AUTOMATIC SPEED MATCHER

Filed Nov. 26, 1938  2 Sheets-Sheet 1

WITNESSES:

INVENTOR
Finn H. Gulliksen.
BY
ATTORNEY

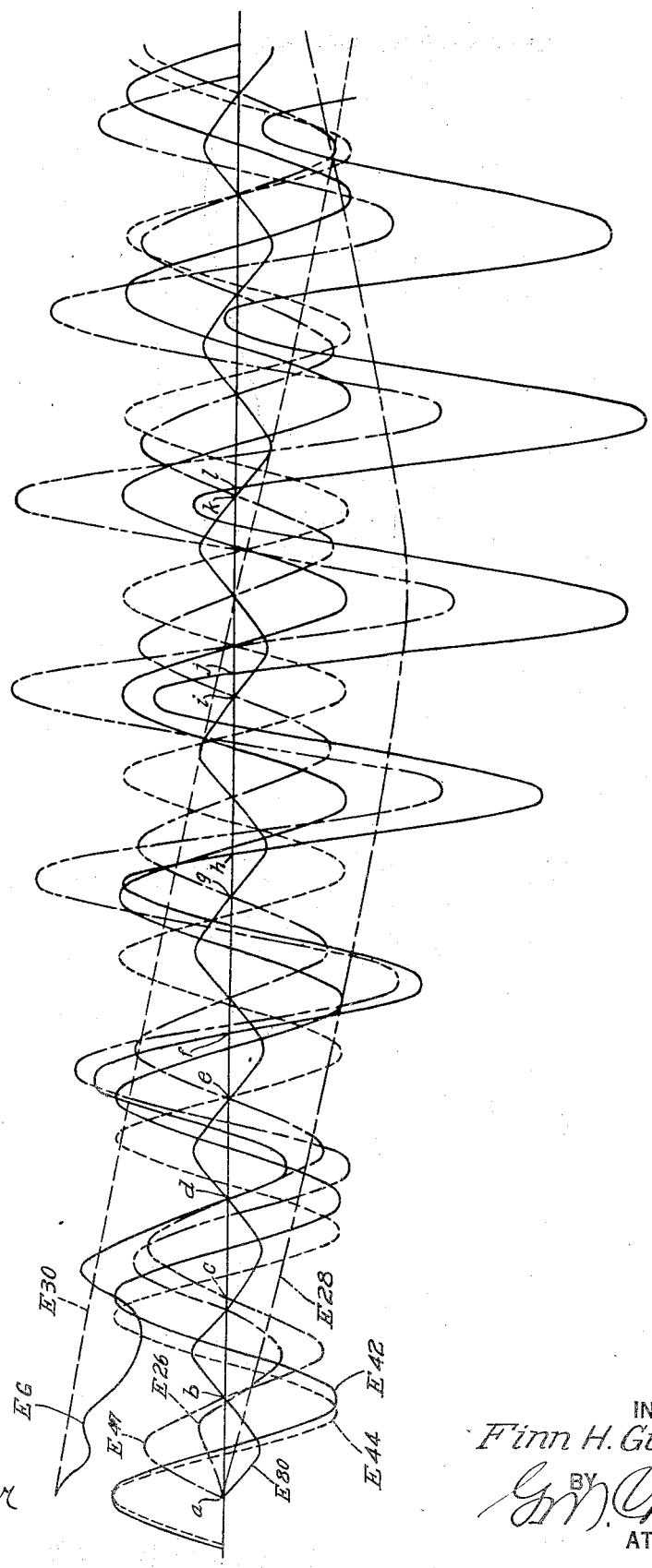

Patented Mar. 4, 1941

2,233,604

UNITED STATES PATENT OFFICE 2,233,604

AUTOMATIC SPEED MATCHER

Finn H. Gulliksen, Pittsburgh, Pa., assignor to Westinghouse Electric & Manufacturing Company, East Pittsburgh, Pa., a corporation of Pennsylvania Application November 26, 1938, Serial No. 242,513

10 Claims. (Cl. 171—119)

My invention relates, generally, to automatic speed matchers and, more particularly, to a speed matcher employing electric-discharge devices for automatically regulating the speed of one machine to make it correspond with the speed of another machine.

Speed matchers of the mechanical type are in common use in power stations where they function to compare the speed of an alternating-current generator which is to be connected to the station bus with the speed of the machines feeding the bus by determining the speed differential between the speeds of synchronous motors connected to the bus and the oncoming generator. The speed of the oncoming generator is regulated in accordance with this differential speed. Such speed matchers have the disadvantages that they are not sufficiently accurate, that they are difficult to keep in adjustment, and that they impose an excessive power burden upon the instrument transformers which connect the speed matcher with the system.

An object of my invention is to provide a speed matcher employing electric discharge devices which shall be simple, efficient, sensitive and accurate in operation, which shall require a minimum of power for its operation, and which shall be inexpensive to manufacture, install and maintain.

These and other objects and advantages of my invention will be apparent from the following detailed description taken in connection with the accompanying drawings in which:

Figure 1 is a diagrammatic representation of the preferred embodiment of my invention, and Fig. 2 is a graph showing the relations of the various potentials acting on the several parts of the preferred embodiment of my invention.

In carrying out my invention, I provide electric discharge devices 10 and 12 which selectively energize relays 14 and 16, respectively, which, in turn, control the speed control instrumentalities 19 of a generator 17 whose speed it is desired to so control that its generated frequency will be the same as that of the alternating current bus represented by conductors A—B—C.

A transformer 18 is connected to conductors of the bus X—Y—Z which is energized by the oncoming generator and the transformers 20 and 22 have their primaries connected to the bus A—B—C. The secondaries of these transformers are connected to resistance elements 24, 26, 28, 30 and 32 and full wave rectifiers 34 and 36 to provide the necessary grid and plate potentials for the electric discharge devices 10 and 12 to cause them to selectively operate their associated relays 14 and 16, depending upon whether the frequency of the oncoming machine 17 is greater or less than that of the bus A—B—C. The circuits are so arranged as to provide a degree of speed correction for the oncoming machine 17 proportional to the difference of the two frequencies which are being matched.

Referring to Fig. 1 of the drawings for a more detailed description of the invention, the speed control instrumentalities 19 for the generator 17 comprise a prime mover such as a turbine 21 connected to drive the generator 17. The speed of the prime mover 21 is controlled by a valve 23 in its supply conduit 25. The opening of the valve 23 may be decreased and increased by the reversing series motor 27 by the selective actuation of relays 14 and 16 whose contacts are connected as shown to selectively energize the motor to cause it to run in a forward or a reverse direction.

The filaments of the electric discharge devices 10 and 12 are energized as shown from the transformer 38 which, in turn, is connected to a secondary winding 40 of the transformer 22. The resistor 26 is connected in series circuit relation with a secondary winding 42 of the transformer 22 and a secondary winding 44 of the transformer 18. The grids of the electric discharge devices 10 and 12 are connected to respective ends of the resistor 26 and thus are energized by the potential drop across the resistor 26. It will be seen that the potential drop across the resistor 26 is the difference of the instantaneous potentials of the secondary windings 42 and 44 and, the grids of electric discharge devices 10 and 12 being connected to opposite ends of the resistor 26, the potentials acting upon the grids will be of opposite polarity, that is, will be displaced 180° from each other.

The plate circuit for the electric discharge devices 10 and 12 extends from the plates of the devices through their associated relays 14 and 16, through conductor 46, a section 47 of the resistor 24, conductor 48 and the secondary of the transformer 38 and its connections to the filaments of the discharge devices. The plate potential for the discharge devices 10 and 12 is derived from the potential drop across the resistor section 47. The resistor 24 is connected in series circuit relation with a secondary winding 49 of the transformer 20 and a secondary winding 50 of the transformer 22. The primary of the transformer 20 is connected to a different phase of the alternating current bus A—B—C from that to which the primary winding of the transformer 22 is connected, and a tap is taken on the secondary winding 50, and the windings 49 and 50 are so connected as to produce a potential drop across the resistor 24 which is substantially 90 electrical degrees behind the potential acting on the secondary winding 42 of the transformer 22.

A second grid potential for the electric discharge devices 10 and 12 is provided by connecting the resistor 28 to the rectifier 34 which, in turn, is connected in series circuit relation with the secondary winding 40 of the transformer 22 and a secondary winding 52 of the transformer 18. Thus the potential acting across the resistor 28 will be the difference of the potentials acting on the buses A—B—C and X—Y—Z rectified. The condensers 54 and 56 and the choke coil 58 are provided for smoothing out the rectified current from the windings 40 and 52 to provide a beat frequency across the resistor 28 equal to the difference in the frequencies of the bus A—B—C and the oncoming generator 17 to which the bus X—Y—Z is connected.

A third grid potential is derived from the potential drop across the resistor 30. The rectifier 36 is connected in series circuit relation with a secondary winding 60 of the transformer 22, and a secondary winding 62 of the transformer 18, and the resistor 32 is connected across the rectifier 36. A condenser 64 is connected across the resistor 32 to smooth out the rectified potential applied thereto. A series circuit comprising a condenser 66 and the resistor 30 is connected in parallel circuit relation with a part of the resistor 32. It will be seen from these circuit connections that the resistor 32 will be energized at a beat frequency equal to the difference of the frequencies of the bus A—B—C and the oncoming generator 17, and that the condenser 66 will be charged and discharged in accordance with the rate of change of the potential acting on the resistor 32 to thus cause a potential which is proportional to the rate of change of potential in the resistor 32 to be applied to the resistor 30. Thus the potential acting on the resistor 30 is proportional to the rate of change of the beat frequency potential and reverses its polarity when the direction of the change of the beat frequency potential acting on the resistor 32 changes.

The grid circuit for the electric discharge devices 10 and 12 extends from the grids of these devices through the adjacent sections of the resistor 26 to a conductor 68 which is connected to a point of the resistor 26 intermediate its ends, through a conductor 70, the resistor 28, conductors 72 and 74, the resistor 30, conductors 76 and 78, a section 80 of the resistor 24, and the conductor 48 to the secondary winding of the transformer 38 and its connections to the filament of the discharge devices 10 and 12. Thus, it will be seen that the grids of the electric discharge devices 10 and 12 will have potentials acting upon them due to the drop across their associated portions of the resistor 26, a potential drop across the resistor 28 which is a beat frequency potential, the potential drop across the resistor 30 which is proportional to the rate of change of the beat frequency potential, and the potential drop across the section 80 of resistor 24 which has the frequency of the potential of the bus A—B—C and is 180° displaced from the plate potential of the discharge devices 10 and 12.

Referring to Fig. 2 for a graphic representation of these several potentials, the potential represented by the curve E26 is the potential drop across the resistor 26 and is made up of the difference between the potentials E42 and E44 which are the potentials provided by the secondary windings 42 and 44 of the transformers 22 and 18, respectively. The potential drop across the resistor 28 is represented by the beat frequency potential curve E28 and the potential drop across the resistor 30 is represented by the curve E30. The curve E80 represents the grid potential provided by the drop across the section 80 of the resistor 24. It will be seen that the frequency of the potential E44 is greater than that of the potential E42, indicating that the potential of the oncoming generator 17 has a higher frequency than that of the bus A—B—C. The connections are such that under these conditions the potential E26 will be the potential acting upon the grid of the electric discharge device 10. At the same time an equal potential opposite in direction to the potential E26 will be acting upon the grid of the electric discharge device 12. The sum of the potentials E26, E28, E30 and E80 is represented by the curve EG which is the potential acting upon the grid circuit of the electric discharge device 10.

The electric discharge device 10 will be conducting current to energize its relay 14 when its grid potential is positive and there is a positive potential upon its plate circuit. Thus, the discharge device 10 will be conducting current when the positive values of the curves EG and E47 coincide. For the conditions shown, the discharge device 10 will conduct current to energize the relay 14 during the intervals represented by the spaces $a$ to $b$, $c$ to $d$, $e$ to $f$, $g$ to $h$, $i$ to $j$, and $k$ to $l$. These intervals of energization of the relay 14 will cause an impulse of actuation proportional to the sum of these intervals of energization and will cause the relay 14 to energize the speed control instrumentalities 19 of the oncoming generator 17 to decrease the speed of the generator an amount depending upon the impulse of actuation of the relay 14, and such an impulse will be imparted to the relay 14 at beat frequency intervals. Since the potential E30 is proportional in amplitude to the rate of change of the beat frequency, it will be apparent that the amplitude of the potential E30 will be proportional to the frequency difference between the potential of the oncoming generator 17 and the bus A—B—C. Thus, with a greater difference in frequency between the potentials E42 and E44, the potential E30 will have a greater amplitude, and this will tend to lengthen the intervals of energization of the relay 14 represented by the spaces $e$ to $f$, $g$ to $h$, $i$ to $j$, and $k$ to $l$. In a like manner, for a smaller difference in frequency between the potentials E42 and E44, the amplitude of the potential E30 will be less and the intervals of energization of the relay 14 will be lower. Thus the degree of speed correction applied to the oncoming generator 17 through energization of its control relay 14 will be proportional to the frequency difference between the oncoming generator 17 and the bus A—B—C.

When the frequency of the oncoming generator 17 is less than that of the bus A—B—C, the potential E26 which represents the potential acting upon the grid of the discharge device 10 will be similar to that illustrated in Fig. 2, but will be opposite in direction, and there will be a potential similar to the potential E26 illustrated in Fig. 2 acting upon the grid of the electric discharge device 12. Thus, for the condition in which the oncoming generator frequency is less than that of the bus A—B—C, a grid potential very similar to that represented by the curve EG of Fig. 2 will be acting upon the electric discharge device 12 to cause it to energize its associated relay 16 to increase the speed of the oncoming generator 17 in proportion to the difference between the frequencies of the oncoming generator and the bus A—B—C.

It will be seen that there are adjustable taps on the resistors 24, 28 and 32. These are provided so that relative values of potentials supplied by these resistors may be adjusted as desired to provide the desired operating characteristics for the system.

It is to be understood that the electric discharge devices 10 and 12 may be any of the types of electronic tubes or valves which have a principal circuit and a control circuit, that is, principal electrodes and a control electrode, and that the speed control devices for the oncoming generator may be any of the well known devices which will vary the speed of the generator 17 in response to the energization of a circuit by the relays 14 and 16. It is to be further understood that the transformers 22 and 18 need not necessarily have a plurality of secondary windings and that the potentials derived from these transformers may be supplied by any other suitable means which will provide the desired potentials and phase relations.

It will be seen that I have provided an automatic speed matcher which shall function to increase or decrease the speed of an oncoming generator in accordance with the amount of frequency difference between the generator and a bus having a potential of substantially fixed frequency applied thereto which shall be simple, efficient, sensitive and accurate in operation, which shall require a minimum of power for its operation and which shall be inexpensive to manufacture, install and maintain.

In compliance with the requirements of the patent statutes, I have shown and described herein the preferred embodiment of my invention. It is to be understood, however, that the invention is not limited to the precise construction shown and described, but is capable of modification by one skilled in the art, the embodiment herein shown and described being merely illustrative of the principles of my invention.

I claim as my invention:

1. In a speed control system for causing the frequency of an alternating-current generator to match a substantially constant frequency, means including a first relay for increasing the generator speed, means including a second relay for decreasing the generator speed, an electric discharge device having principal and control electrodes connected to control the energization of each of said relays, and electrical means for applying such potentials to said discharge devices as will cause selective actuation of said relays in accordance with the differential between the fixed frequency and the generator frequency, said electrical means comprising, means for applying first potentials of opposite polarities proportional to the instantaneous difference of the potentials of the generator and the fixed frequency to the control electrodes of the respective discharge devices, means for applying a second potential proportional to the instantaneous difference of the potentials of the generator and the fixed frequency rectified to the control electrodes of said discharge devices in series circuit relation with said first potentials, and means for applying a third potential proportional to the rate of change of said second potential to the control electrodes of said discharge devices in series circuit relation with said first and second potentials.

2. In a speed control system for causing the frequency of an alternating-current generator to match a substantially constant frequency, means including a first relay for increasing the generator speed, means including a second relay for decreasing the generator speed, an electric discharge device having principal and control electrodes connected to control the energization of each of said relays, and electrical means for applying such potentials to said discharge devices as will cause selective actuation of said relays in accordance with the differential between the fixed frequency and the generator frequency, said electrical means comprising, means for applying first potentials of opposite polarities proportional to the instantaneous difference of the potentials of the generator and the fixed frequency to the control electrodes of the respective discharge devices, means for applying a second potential proportional to the instantaneous difference of the potentials of the generator and the fixed frequency rectified to the control electrodes of said discharge devices in series circuit relation with said first potentials, and means for applying a third potential proportional to the rate of change of said second potential to the control electrodes of said discharge devices in series circuit relation with said first and second potentials, means for applying a potential to the principal electrodes of said discharge devices of a frequency equal to the fixed frequency and displaced substantially 90 electrical degrees from the fixed frequency potential, and means for applying a potential of opposite polarity to, and having substantially less magnitude than said potential applied to the principal electrodes, in series circuit relation with said potential applied to the control electrodes.

3. In a speed control system for matching the frequency of an alternating-current generator with that of an energized alternating-current bus to which the generator is to be connected, two electric discharge devices each having a control electrode and a plurality of principal electrodes, two transformers having their primary windings connected to the bus and the generator respectively and their secondary windings connected in series circuit relation, a first resistor connected in series circuit relation with said transformer secondary windings, means connecting each of the control electrodes of said discharge devices to one of two spaced points on said resistor, a second resistor, means for energizing said second resistor with a potential derived from the instantaneous difference between the potentials of the bus and the generator rectified, a third resistor, means for energizing said third resistor with a potential which varies in accordance with the rate of change of the potential applied to said second resistor, means connecting one of said second and third resistors to an intermediate point of said first resistor, means connecting said second and third resistors in series circuit relation to provide, along with the potential acting on said first resistor, a resultant control potential for the control electrodes of said discharge devices for selectively rendering said discharge devices conductive in accordance with the frequency differential betwen the bus and the generator voltages, means providing an energizing potential for the principal electrodes of said discharge devices, and means for selectively increasing and decreasing the speed of the generator in response to the selective conduction of current by said discharge devices.

4. In a speed control system for matching the frequency of an alternating-current generator with that of an energized alternating-current bus to which the generator is to be connected, two electric discharge devices each having a control electrode and a plurality of principal electrodes, two transformers having their primary windings connected to the bus and the generator respectively and their secondary windings connected in series circuit relation, a first resistor connected in series circuit relation with said transformer secondary windings, means connecting each of the control electrodes of said discharge devices to one of two spaced points on said resistor, a second resistor, means for energizing said second resistor with a potential derived from the instantaneous difference between the potentials of the bus and the generator rectified, a third resistor, means for energizing said third resistor with a potential derived from the instantaneous difference between the potentials of the bus and the generator rectified, a fourth resistor and a condenser connected in series circuit relation with said third resistor, means for connecting one of said second and fourth resistors to a point intermediate said spaced points of said first resistor, means connecting said second and fourth resistors in series circuit relation to provide, along with the potential acting on said first resistor, a resultant control potential for the control electrodes of said discharge devices for selectively rendering said discharge devices conductive in accordance with the frequency differential between the bus and the generator voltages, means providing an energizing potential for the principal electrodes of said discharge devices, and means for controlling the speed of the generator in response to the selective conduction of current by said discharge devices.

5. In a speed control system for matching the frequency of an alternating current generator with that of an energized alternating-current bus to which the generator is to be connected, two electric discharge devices each having a control electrode and a plurality of principal electrodes, two transformers having their primary windings connected to the bus and the generator respectively and their secondary windings connected in series circuit relation, a first resistor connected in series circuit relation with said transformer secondary windings, means connecting each of the control electrodes of said discharge devices to one of two spaced points on said resistor, a second resistor, means for energizing said second resistor with a potential derived from the instantaneous difference between the potentials of the bus and the generator rectified, a third resistor, means for energizing said third resistor with a potential which varies in accordance with the rate of change of the potential applied to said second resistor, a fourth resistor, means for energizing said fourth resistor with a potential displaced substantially 90 electrical degrees behind the potential of the bus, means connecting one of said second, third and fourth resistors to an intermediate point of said first resistor, means connecting said second and third resistors and a part of said fourth resistor in series circuit relation to provide, along with the potential acting on said first resistor, a resultant control potential for the control electrodes of said discharge devices for selectively rendering said discharge devices conductive in accordance with the frequency differential between the bus and the generator voltages, means providing an energizing potential for the principal electrodes of said discharge devices, and means for controlling the speed of the generator in response to the selective conduction of current by said discharge devices.

6. In a speed control system for matching the frequency of an alternating current generator with that of an energized alternating-current bus to which the generator is to be connected, two electric discharge devices each having a control electrode and a plurality of principal electrodes, two transformers having their primary windings connected to the bus and the generator respectively and their secondary windings connected in series circuit relation, a first resistor connected in series circuit relation with said transformer secondary windings, means connecting each of the control electrodes of said discharge devices to one of two spaced points on said resistor, a second resistor, means for energizing said second resistor with a potential derived from the instantaneous difference between the potentials of the bus and the generator rectified, a third resistor, means for energizing said third resistor with a potential which varies in accordance with the rate of change of the potential applied to said second resistor, a fourth resistor, means for energizing said fourth resistor with a potential displaced substantially 90 electrical degrees behind the potential of the bus, means connecting one of said second, third and fourth resistors to an intermediate point of said first resistor, means connecting said second and third resistors and a part of said fourth resistor in series circuit relation to provide, along with the potential acting on said first resistor, a resultant control potential for the control electrodes of said discharge devices for selectively rendering said discharge devices conductive in accordance with the frequency differential between the bus and the generator voltages, means including said fourth resistor for providing an energizing potential for the principal electrodes of said discharge devices, and means for controlling the speed of the generator in response to the selective conduction of current by said discharge devices.

7. In a control system for matching the frequency of an alternating-current generator with that of an energized alternating-current bus, two electric discharge devices each having a control electrode and a plurality of principal electrodes, a first resistor, means for energizing said first resistor with a potential derived from the instantaneous difference between the potentials of the bus and generator, a second and a third resistor, means for energizing said second and third resistors with potentials derived from the instantaneous difference between the potentials of the bus and the generator rectified, a fourth resistor, a condenser, means connecting said fourth resistor, said condenser and said third resistor in series circuit relation, means connecting one of said second and fourth resistors to an intermediate point of said first resistor, means connecting said second and fourth resistors in series circuit relation to provide, along with the potential acting on said first resistor, a resultant control potential for the control electrodes of said discharge devices for selectively rendering said discharge devices conductive in accordance with the frequency differential between the bus and generator voltages, means providing energizing potential for the principal electrodes of said discharge devices, and speed control means for the generator responsive to the selective conduction of current by said discharge devices.

8. In a control system for matching the frequency of an alternating-current generator with that of an energized alternating-current bus, two electric discharge devices each having a principal circuit and a control circuit, means for impressing upon the control circuits of said discharge devices first potentials derived from the instantaneous difference between the potentials of the bus and generator, the first potentials being displaced substantially 180 electrical degrees from each other in the respective control circuits, means for impressing upon the control circuit of both of said discharge devices a rectified potential derived from the instantaneous difference between the potentials of the bus and generator, means for impressing upon the control circuit of both of said discharge devices a third potential which varies with the rate of change of said rectified potential, means providing energization for the principal circuits of said discharge devices, and means responsive to the selective conduction of current by said discharge devices for varying the speed of the generator.

9. In a control system for matching the frequency of an alternating-current generator with that of an alternating-current energized bus, two electric discharge devices each having a principal circuit and a control circuit, means for impressing upon the control circuits of said discharge devices first potentials derived from the instantaneous difference between the potentials of the bus and generator, the first potentials being displaced substantially 180 electrical degrees from each other in the respective control circuits, means for impressing upon the control circuit of both of said discharge devices a rectified potential derived from the instantaneous difference between the potentials of the bus and generator, means for impressing upon the control circuit of both of said discharge devices a third potential which varies with the rate of change of said rectified potential, means for impressing upon the control circuit of both of said discharge devices a fourth potential which is displaced substantially 90 electrical degrees ahead of the bus voltage, means for impressing upon the principal circuits of said discharge devices a potential which is displaced substantially 90 electrical degrees behind the bus potential, and means responsive to the selective conduction of current by said discharge devices for controlling the speed of the generator.

10. In a control system for matching the frequency of an alternating-current generator with that of an alternating-current-energized bus, a first transformer having its primary winding connected to be energized from the bus, a second transformer having its primary winding connected to be energized by the generator, a first resistor connected to be energized by the differential of the secondary potentials of said first and second transformers, a pair of electric discharge devices each having a control electrode and a plurality of principal electrodes, circuit means connecting said control electrodes each to a different end of said first resistor, a second resistor, a first rectifier, circuit means connecting said second resistor to be energized by the differential of the secondary potentials of said first and second transformers through said first rectifier, a third resistor, a second rectifier, circuit means connecting said third resistor to be energized by the differential of the secondary potentials of said first and second transformers through said second rectifier, a fourth resistor, a condenser, circuit means connecting said condenser and said third and fourth resistors in series circuit relation, a fifth resistor, means energizing said fifth resistor with a potential displaced substantially 180 electrical degrees from the secondary potential of said first transformer, circuit means connecting said second and fourth resistors and a first portion of said fifth resistor in a series circuit extending from a point on said first resistor intermediate its ends and completing a control circuit for both of said discharge devices, an energizing circuit for the principal electrodes for each of said discharge devices including a second portion of said fifth resistor, and speed control means for the generator responsive to the selective conduction of current by said discharge devices.

FINN H. GULLIKSEN.